United States Patent [19]

Le Ludec

[11] 3,927,101

[45] Dec. 16, 1975

[54] PROCESS FOR THE PREPARATION OF HYDROXYLAMINES BY HYDROGENATION OF AROMATIC NITRO DERIVATIVES

[75] Inventor: Joel Le Ludec, Lyon, France

[73] Assignee: Rhone-Poulenc S.A., Paris, France

[22] Filed: Jan. 15, 1974

[21] Appl. No.: 433,560

Related U.S. Application Data

[63] Continuation-in-part of Ser. No. 364,757, May 29, 1973.

[30] Foreign Application Priority Data

Nov. 21, 1973 France .............................. 73.41444

[52] U.S. Cl.............................. 260/580; 260/570 R
[51] Int. Cl.²......................................... C07C 83/02
[58] Field of Search...................................... 260/580

[56] References Cited
UNITED STATES PATENTS 3,455,987   7/1969   Freifelder ...................... 260/580 X
3,694,509   9/1972   Rylander et al. ............... 260/580 X

OTHER PUBLICATIONS

Abidova et al., "Chem. Abstracts," Vol. 59, p. 5049a (1963).

Primary Examiner—Lewis Gotts
Assistant Examiner—S. P. Williams
Attorney, Agent, or Firm—Cushman, Darby & Cushman

[57] ABSTRACT

Aromatic hydroxylamines are prepared by hydrogenating the corresponding aromatic nitro compound in the presence of a platinum catalyst and organic base which is a secondary or tertiary alkyl or cycloalkyl monoamine, pyrrolidine or piperidine or N- or C-alkyl derivatives thereof, N-alkyl or N-cycloalkyl anilines or C-alkyl derivatives thereof, pyridine, alkylpyridines, quinoline or isoquinoline, the weight ratio of organic base to nitro compound being greater than 0.1:1.

6 Claims, No Drawings

PROCESS FOR THE PREPARATION OF HYDROXYLAMINES BY HYDROGENATION OF AROMATIC NITRO DERIVATIVES

This application is a continuation-in-part of my co-pending application Ser. No. 364,757 filed May 29, 1973.

The present invention relates to a process for the preparation of aromatic hydroxylamines by selective catalytic hydrogenation of aromatic nitro derivatives.

It is known that during the catalytic hydrogenation, the nitro derivatives are converted, in an intermediate stage, to partially reduced derivatives, the most important of which are notroso derivatives and hydroxylamines; however, these intermediate derivatives cannot generally be isolated because they are rapidly reduced to their corresponding amine derivatives. In order to obtain certain hydroxylamines, it has been proposed, to use, as the catalyst, either palladium on charcoal [K. Brand and J. Steiner, Ber., 55, 875 (1922)] or freshly prepared and very carefully washed Raney nickel [A. Sugimori, Bull. Chem. Soc. Japan 33, 1599 (1960)]. In each case, it is however necessary to interrupt the reaction when the amount of hydrogen consumed corresponds to that which can be calculated from the stoichiometric requirements of the reaction. Other authors, such as K. Taya [Chem. comm., 464–5 (1966)], have proposed the selective reduction of nitrobenzene, nitrotoluenes and nitrochlorobenzenes to hydroxylamines by means of a catalyst based on iridium or by means of a mixed iridium-platinum catalyst. These catalysts lead to satisfactory selectivity but the rate of hydrogenation is slow.

The catalysts based on platinum generally reduce the nitro derivatives to the final hydrogenation stage, namely the amine. Thus, when nitrobenzene is reduced with a catalyst based on platinum prepared according to the method of Adam, aniline is essentially produced, even by interrupting the reaction after the theoretical amount of hydrogen has been consumed (K. Taya; reference mentioned).

The present invention provides a process for the preparation of aromatic hydroxylamines of the formula:

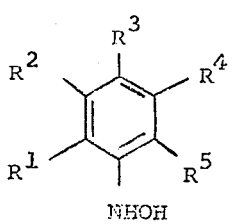

in which each of $R^1$, $R^2$, $R^3$, $R^4$ and $R_5$ represents a hydrogen atom, a straight or branched alkyl radical, a cycloalkyl radical or a phenyl, phenylalkyl or alkylphenyl radical, or wherein two of the radicals $R^1$, $R^2$, $R^3$, $R^4$ or $R^5$, attached to adjacent carbon atoms of the benzene ring, together with the two carbon atoms of the benzene ring to which they are attached, form a second benzene ring which is ortho-condensed with the first benzene ring, which comprises hydrogenating an aromatic nitro derivative of the formula:

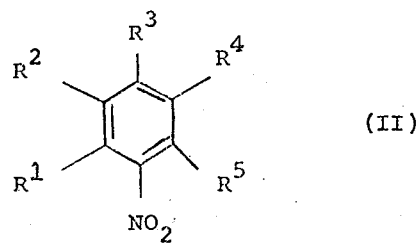

in which $R^1$, $R^2$, $R^3$, $R^4$ and $R^5$ are as defined above in the presence of a platinum catalyst and in the presence of a nitrogencontaining organic base selected from the group consisting of secondary and tertiary alkyl and cycloalkyl monoamines, pyrrolidine and piperidine, and pyrrolidines and piperidines substituted by at least one alkyl group, bonded to a ring atom; N-alkyl and N-cycloalkyl aniline and N-alkyl and N-cycloalkyl anilines containing at least one alkyl group bonded to a carbon atom of the ring; pyridine and alkylpyridines and quinoline and isoquinoline; the ratio by weight of the organic base to the nitro compound being greater than 0.1:1.

The use of the nitrogen-containing organic base during the hydrogenation of the aromatic nitro compound (II) makes it possible to stop the reaction at the hydroxylamine stage. The quantity of organic base employed must be sufficient to provide the selectivity. In particular, it has been found that the use of the base in trace amounts did not make it possible to stop the hydrogenation at the hydroxylamine stage. The ratio by weight of organic base to nitro compound, which is, as indicated above, greater than 0.1, is preferably between 0.5 and 5, the upper limit of course not being critical.

The categories of nitrogen-containing organic bases which have just been defined are well described in the chemical literature. For example, a long list of these compounds is found in the book by D. D. Perrin, Dissociation Constants of Organic Bases in Aqueous Solution (1965).

The secondary or tertiary monoamines preferentially contain alkyl groups with 1 to 6 carbon atoms or cyclopentyl or cyclohexyl groups. Amongst these aliphatic or cycloaliphatic amines, there may be mentioned by way of illustration diethylamine, dibutylamine, diisopropylamine, triethylamine and dicyclohexylamine.

Pyrrolidine and piperidine as well as substituted pyrrolidines and piperidines containing 1 or 2 alkyl groups with 1 to 4 carbon atoms are also preferentially used within the scope of the invention. These hydrocarbon substituents can be carried by the nitrogen atom or by carbon atoms. By way of illustration, N-methylpyrrolidine, 2-ethyl-pyrrolidine, N-(n-butyl)-pyrrolidine, 1-ethyl-2-methyl-pyrrolidine, 1,2-dimethyl-pyrrolidine, N-ethyl-piperidine, 1-, 2- or 3-methyl-piperidine, 1,2- or 2,6-dimethyl-piperidine, 1-ethyl-2-methylpiperidine and N-butyl-piperidine may be mentioned.

The N-alkylated or N-cycloalkylated anilines preferentially contain alkyl groups which are bonded to the nitrogen atom and which have 1 to 4 carbon atoms, or cyclopentyl or cyclohexyl groups. These anilines can optionally contain an alkyl substituent which is carried by a carbon atom of the ring and which contains 1 to 4 carbon atoms. Amongst these anilines, the following compounds may be mentioned by way of illustration: N-methyl-aniline, N-ethyl-aniline, N-butyl-aniline, N-cyclohexyl-aniline, N-butyl-N-methyl-aniline, N,N-dimethyl-aniline, N,N-dibutyl-aniline and N-methyl-2-or -3-methyl-aniline.

The alkylated pyridines which are preferentially used contain one or two alkyl substituents with 1 to 4 carbon atoms. Amongst the alkyl-pyridines, there may be mentioned by way of illustration: 2-(or 3- or 4-) methyl-pyridines, 2-(or 3- or 4-) ethyl-pyridines, 2-(or 3- or 4-) butyl-pyridines, 2,3-(or 2,5- or 2,4-) dimethyl-pyridines and 3-ethyl-5-(or -6-) methyl-pyridine.

The nitrogen-containing organic bases which are used as reaction medium are in practice chosen from the categories mentioned above, as a function of their availability on the industrial scale. Differences in selectivity, which are generally not large, for the hydrogenation of a well-defined nitro derivative, can be observed as a function of the value of the basicity ($pK_A$). The organic bases which are preferentially used are in general diethylamine, triethylamine, pyrrolidine, piperidine, pyridine or quinoline.

The hydrogenation process is very particularly applicable to the nitro derivatives of the formula (II) in which each of the R groups represents a hydrogen atom, a straight or branched alkyl radical with 1 to 6 carbon atoms, a cyclopentyl or cyclohexyl radical, or a phenyl, phenylalkyl or alkylphenyl radical, the alkyl groups of the phenyl radicals having 1 to 6 carbon atoms, and wherein at least two of the R groups represent hydrogen.

The compounds of the formula (II) in which two radicals R, if they are adjacent, together with the two carbon atoms of the benzene ring to which they are attached, form another benzene ring, are also particularly valuable within the scope of the present invention.

By way of illustration, nitrobenzene, o-nitrotoluene, m-nitrotoluene, p-nitrotoluene, p-isopropylnitrobenzene, m-butyl-nitrobenzene, 1,3-dimethyl- 2- or 4- or 5-)nitrobenzene, 1,3,5-trimethyl-2-nitrobenzene, 4-nitro-biphenyl, 3-( or 4-) nitro-diphenylmethane and (1- or 2- or 3-)nitro-naphthalene may be mentioned amongst the aromatic nitro compounds of the formula (II).

The hydrogenation catalyst is based on platinum which may or may not be deposited on a support. The use of a catalyst based on platinum deposited on a support generally makes it possible to obtain the maximum activity for one and the same content of active metal. Amongst the supports, there may be mentioned by way of illustration porous or non-porous carbon blacks of small or large specific surface areas, alumina, calcium carbonate, barium sulphate and the like. The concentration of platinum on its support is not critical. The latter, expressed by weight, is generally between 0.1 and 15%, and preferably between 0.5 and 10%. The quantity of platinum employed is such that it is generally between 0.001 and 1% of the weight of the nitro derivatives employed in the reaction. This quantity of platinum is preferentially between 0.01% and 0.1% of the weight of the nitro derivatives.

The selective hydrogenation reaction can be carried out at a temperature of between 0° and 100°C, and preferably between 20° and 50°C. The value of the hydrogen pressure, which is generally chosen as a function of the reaction temperature, must be such that the rate of the reaction is sufficiently high, whilst avoiding a secondary hydrogenation reaction of the aromatic hydroxylamines to give amines. As a general rule, the hydrogen pressure is between 1 and 50 effective atmospheres.

An organic diluent can be added to the reaction mixture. For example, lower alcohols such as ethanol or methanol and aliphatic or aromatic hydrocarbons such as hexane or toluene may be mentioned by way of illustration.

The process according to the invention makes it possible to gain access to numerous aromatic hydroxylamines. Amongst the latter, phenylhydroxylamine and phenylhydroxylamines substituted by one or more alkyl groups may be mentioned very particularly. These compounds can be converted easily, by means of the Bamberger rearrangement, into an aminohalogenobenzene, an aminophenol and ethers of aminophenols (HOUBEN-WEYL, Methoden der Organische Chemie Bd 10/1, p. 1249–1251), the industrial applications of which are well known. Moreover, the ammonium salts of N-nitrosophenylhydroxylamines, of which cupferron is a well-known member, can be used as analytical reagents, or to stabilise certain unsaturated monomers such as acrylonitrile (U.S. Pat. No. 2,758,131) and acrylamide (U.S. Pat. No. 2,999,881).

The examples which follow illustrate the invention.

EXAMPLE 1

8.25 g of 2,4,6-trimethyl-nitrobenzene, 0.083 g of a catalyst based on platinum (platinum deposited to the extent of 5% on acetylene black with a specific surface area of 48 m²/g) and 25 ml of piperidine (21.5 g) are introduced into a 125 ml autoclave. After having purged the apparatus, a hydrogen pressure of 4 bars (absolute pressure) is established and stirring is started. The pressure is kept constant and stirring is stopped when the quantity of hydrogen consumed corresponds to the stoichiometric requirements of the reaction. The temperature during the experiment remained at 25°C.

The catalyst is filtered off under a nitrogen atmosphere and a polarographic determination is carried out on the filtrate obtained. The degree of conversion of trimethylnitrobenzene is found to be equal to 96,4%, and the yield of trimethylphenylhydroxylamine relative to the converted product is 92.5%.

Piperidine is removed by evaporation from an aliquot portion of the filtrate (5 ml weighing 4.489 g), and the residue (1.150 g) is taken up in 5 ml of petroleum ether and cooled to about −30°C; the trimethylphenylhydroxylamine which has precipitated is filtered off and dried (weight obtained: 0.928 g; melting point; 135°C; IR and NMR spectra in agreement). The yield of isolated trimethylphenylhydroxylamine, expressed relative to the trimethylnitrobenzene converted, is 84.5%.

EXAMPLE 2

Following the procedure of Example 1, a whole series of experiments for the selective hydrogenation of 2,4,6-trimethyl-nitrobenzene to the corresponding hydroxylamine is carried out, by varying the different parameters. The experiments are carried out at 25°C, in an autoclave, starting with 8.25 g of trimethylnitrobenzene.

If no organic base is added during the reaction, it is found, firstly, that even under a high hydrogen pressure (12 bars) the rate of hydrogenation is very slow, and secondly, that trimethylaniline is essentially formed.

Table

Example 2

| Experiment | Weight of catalyst | Nature of base | Weight of base | Solvent | Pressure, bars (absolute pressure) | Yield relative to the nitro derivative hydrogenated, % |
|---|---|---|---|---|---|---|
| 1 | 0.08 g | Piperidine | 4.2 g | Ethanol 50 ml | 3 | 26.8 |
| 2 | 0.08 g | '' | '' | Toluene 50 ml | 15 | 33.8 |
| 3 | 0.08 g | '' | 12.6 g | Ethanol 50 ml | 3 | 48.5 |
| 4 | 0.08 g | '' | 21.4 g | None | 3 | 58 |
| 5 | 0.08 g | '' | 34.2 g | '' | 3 | 58.6 |
| 6 | 0.08 g | '' | 34.2 g | '' | 9 | 34 |
| 7 | 0.24 g | '' | 34.2 g | '' | 3 | 44.2 |
| 8 | 0.08 g | Diethylamine | 28.4 g | '' | 3 | 58.8 |

EXAMPLE 3

6.07 g of nitrobenzene, 0.06 g of platinum catalyst (that of the preceding examples) and 25 ml of diethylamine are introduced into a 125 ml autoclave. Hydrogenation is carried out at 25°C under an absolute pressure of 3 bars for 70 minutes. After filtering off the catalyst and evaporating to dryness, the residue is treated with 25 ml of hexane, and on cooling and crystallisation 2.822 g of phenylhydroxylamine are obtained (melting point: 81°–82°; IR spectrum in agreement).

EXAMPLE 4

6.85 g of para-nitrotoluene, 0.068 g of catalyst (identical to that of the preceding experiments) and 25 ml of diethylamine are introduced into the autoclave, and the nitro derivative is hydrogenated at 25°C under an absolute pressure of 3 bars for 58 minutes. After filtering off the catalyst, the filtrate is evaporated to dryness and the residue is dissolved in 35 ml of petroleum ether; after cooling and crystallisation, 4.264 g of p-methylphenylhydroxylamine are obtained (melting point: 90°C; IR spectrum in agreement).

EXAMPLE 5

6.85 g of o-nitrotoluene are substituted for the p-nitrotoluene of Example 4. Following an identical procedure, 2.56 g of o-methylphenylhydroxylamine are obtained after crystallisation from petroleum ether (melting point: 40°; IR spectrum in agreement).

EXAMPLE 6

8.25 g of p-nitrocumene, 25 ml of diethylamine and 0.082 g of catalyst (that of the preceding examples) are introduced into a 125 ml autoclave. Hydrogenation is carried out at 25°C under an absolute pressure of 3 bars for 40 minutes. After filtering off the catalyst and evaporating the filtrate to dryness, the solid residue is dissolved in petroleum ether (24 ml); 1.995 g of p-isopropylphenylhydroxylamine are obtained on cooling to 0°C and precipitation (melting point: 70°; IR spectrum in agreement).

EXAMPLE 7

A solution of 6.09 g of nitrobenzene in 25 ml of pyridine (total weight 30.51 g) and 0.065 g of a catalyst based on platinum (platinum deposited to the extent of 4.76% on carbon black with a specific surface area equal to 900 m²/g) are introduced into a 125 ml autoclave. Hydrogenation is carried out at 25°C under an absolute pressure of 10 bars for 1 hour 40 minutes. After filtering off the catalyst under nitrogen, 28.98 g of the filtrate are removed, the pyridine is evaporated and 6.7 g of residue are obtained. The latter is taken up in 25 ml of hexane cooled to about −30°C and is filtered off and then washed with 10 ml of hexane brought to the same temperature.

4.25 g of phenylhydroxylamine (melting point: 85°C; IR spectrum in agreement) are obtained, corresponding to a yield of 83% of isolated product relative to the nitrobenzene employed.

EXAMPLE 8

6.85 g of para-nitrotoluene, 0.073 g of catalyst (identical to that of Example 7) and 25 ml of pyridine are introduced into a 125 ml autoclave. Hydrogenation is carried out under 10 bars absolute pressure, at 25°C, and 95% of the theoretical amount of hydrogen is consumed after 22 hours 55 minutes.

After filtering off the catalyst, the pyridine is removed and 8.47 g of residue are obtained. The latter is taken up in 35 ml of petroleum ether cooled to about −30°C, and the crystals formed are filtered off. 3.69 g of N-(m-tolyl)-hydroxylamine (melting point: 95°C; IR spectrum in agreement) are obtained in a yield of 60% relative to the product employed.

EXAMPLE 9

6.85 g of o-nitrotoluene and 25 ml of pyridine are introduced into the 125 ml autoclave together with 0.073 g of platinum catalyst (the same as that of Examples 7 and 8). Under 20 bars absolute pressure and at 25°C, the reaction stops after 1 hour 26 minutes when 90 to 95% of the theoretical amount of hydrogen is consumed. Following the procedure of Example 8, 7.25 g of residue are obtained and are dissolved in 6 ml of benzene. 100 ml of petroleum ether are added to this solution and, after filtering off the precipitate, 4.58 g of N-(o-tolyl)-hydroxylamine (melting point: 38°C; IR spectrum in agreement) are obtained, corresponding to a yield of 74.5% relative to the starting nitro product.

EXAMPLE 10

8.25 g of nitromesitylene, 25 ml of pyridine (24.43 g) and 0.087 g of platinum catalyst (the same as that of Examples 7, 8 and 9) are introduced into the 125 ml autoclave. Hydrogenation is carried out under 10 bars absolute pressure at 25°C; it is stopped when approximately 95% of the theoretical amount of hydrogen is consumed, after 9 hours.

The catalyst is filtered off under nitrogen, 8.44 g of filtrate are taken and the pyridine is removed from this fraction by evaporation. 1.93 g of crystals are obtained and an NMR determination is carried out on them. The degree of conversion of nitromesitylene is found to be 85% and the yield of mesitylhydroxylamine is 59.5% relative to the converted nitromesitylene.

EXAMPLE 11

0.087 g of the platinum catalyst of Examples 7–10 and 8.25 g of p-nitrocumene in 25 ml of pyridine are introduced into the autoclave. The experiment, carried out under 20 bars absolute pressure at 25°C, is stopped after 2 hours 30 minutes when approximately 85% of the theoretical amount of hydrogen is consumed.

After filtering off the catalyst, the pyridine is removed and 9.25 g of residue are obtained. The latter is taken up in 50 ml of petroleum ether cooled to about −30°C and is filtered off. 3.45 g of N-(p-isopropyl-phenyl)-hydroxylamine (melting point: 73°C; IR spectrum in agreement) are obtained, corresponding to a yield of approximately 46% relative to the nitro product employed.

I claim:

1. In a process for the preparation of an aromatic hydroxylamine of the formula:

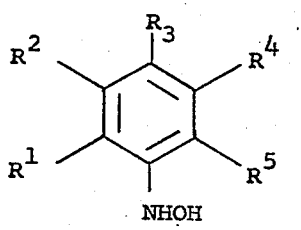

in which each of $R^1$, $R^2$, $R^3$, $R^4$ and $R^5$ represents a hydrogen atom, a straight or branched alkyl radical of 1 to 6 carbon atoms, a cyclopentyl or cyclohexyl radical or a phenyl, phenylalkyl or alkylphenyl radical where the alkyl radical contains 1 to 6 carbon atoms, at least two of $R^1$, $R^2$, $R^3$, $R^4$ and $R^5$ representing hydrogen or wherein two of the radicals $R^1$, $R^2$, $R^3$, $R^4$ or $R^5$, attached to adjacent carbon atoms of the benzene ring together with the two carbon atoms of the benzene ring to which they are attached form a second benzene ring which is ortho-condensed with the first benzene ring, by hydrogenating an aromatic nitro derivative of the formula:

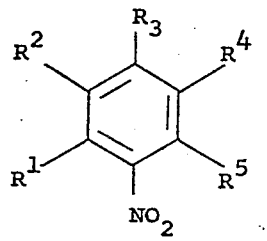

in which $R^1$, $R^2$, $R^3$, $R^4$ and $R^5$ are as defined above in the presence of a platinum catalyst, the improvement which consists of effecting the hydrogenation in the presence of a nitrogen-containing organic base selected from the group consisting of secondary and tertiary alkylmonoamines containing 1 to 6 carbon atoms in each alkyl group, cyclopentylamine and cyclohexylamine, pyrrolidine and piperidine, and pyrrolidines and piperidines substituted by 1 or 2 alkyl groups each containing up to 4 carbon atoms, bonded to a ring atom; N-alkyl and N-cycloalkyl anilines where the N-alkyl group contains 1 to 4 carbon atoms, the N-cycloalkyl group is cyclopentyl or cyclohexyl and the aniline ring is unsubstituted or substituted by an alkyl group of 1 to 4 carbon atoms, pyridine, alkyl and dialkyl pyridines where the alkyl group contains 1 to 4 carbon atoms, quinoline and isoquinoline, the ratio by weight of the organic base to the nitro compound being from 0.5:1 to 5:1.

2. Process according to claim 1 wherein each of $R^1$, $R^2$, $R^3$, $R^4$ and $R^5$, which may be the same or different, represents hydrogen, methyl, isopropyl, butyl of benzyl.

3. Process according to claim 1 wherein the organic base is diethylamine, triethylamine, pyrrolidine, piperidine, pyridine or quinoline.

4. Process according to claim 1 wherein the platinum comprises 0.001 to 1% by weight of the weight of the nitro derivative.

5. Process according to claim 1 carried out in the presence of a lower alkanol or a hydrocarbon.

6. Process according to claim 1 wherein nitrobenzene, nitro toluene, nitrocumene, nitro mesitylene or 2,4,6-trimethylnitrobenzene is hydrogenated in the presence of piperidine, diethylamine or pyridine and the corresponding phenyl hydroxylamine is obtained as the major hydrogenation product.

* * * * *